(12) United States Patent
Prinsen et al.

(10) Patent No.: US 11,941,359 B2
(45) Date of Patent: Mar. 26, 2024

(54) IDENTIFYING ANATOMICAL PHRASES

(71) Applicant: KONINKLIJKE PHILIPS N.V., Eindhoven (NL)

(72) Inventors: Peter Prinsen, Eindhoven (NL); Robbert Christiaan van Ommering, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 63 days.

(21) Appl. No.: 16/980,548

(22) PCT Filed: Mar. 11, 2019

(86) PCT No.: PCT/EP2019/055954
§ 371 (c)(1),
(2) Date: Sep. 14, 2020

(87) PCT Pub. No.: WO2019/175075
PCT Pub. Date: Sep. 19, 2019

(65) Prior Publication Data
US 2021/0004533 A1    Jan. 7, 2021

Related U.S. Application Data

(60) Provisional application No. 62/642,933, filed on Mar. 14, 2018.

(51) Int. Cl.
*G06F 40/289*         (2020.01)

(52) U.S. Cl.
CPC ................................ *G06F 40/289* (2020.01)

(58) Field of Classification Search
CPC ............. G06F 40/289; G06F 16/24578; G06F 16/367; G06F 40/205; G06F 40/30; G06F 40/45; G06F 16/288
See application file for complete search history.

(56) References Cited

U.S. PATENT DOCUMENTS

| 7,610,192 | B1 | 10/2009 | Jamieson |
| 9,047,283 | B1* | 6/2015 | Zhang ............... G06F 16/24578 |
| 9,524,289 | B2* | 12/2016 | Rachevsky .............. G06F 40/30 |
| 9,588,950 | B2* | 3/2017 | Kramer ................. G06F 40/134 |
| 10,102,274 | B2* | 10/2018 | Mittal ................. G06F 16/3344 |
| 10,198,499 | B1* | 2/2019 | McNair .................. G16H 15/00 |
| 2008/0228769 | A1 | 9/2008 | Lifa |
| 2009/0313243 | A1 | 12/2009 | Buitelaar et al. |

(Continued)

FOREIGN PATENT DOCUMENTS

WO     2014210301  A1    12/2014

OTHER PUBLICATIONS

Dligach et al, Discovering body site and severity modifiers in clinical texts, publisher: J Am Med Inform Assoc, published: 2014; pp. 448-454 (Year: 2014).*

(Continued)

*Primary Examiner* — Wilson W Tsui
(74) *Attorney, Agent, or Firm* — Larry Liberchuk

(57) ABSTRACT

Methods and systems for identifying anatomical phrases in medical text. Methods and systems described herein use a syntactic approach to generate lists of relevant terms and define a grammar on these terms. Methods and systems described then search for phrases in text that conform to the grammar.

12 Claims, 3 Drawing Sheets

(56) References Cited

U.S. PATENT DOCUMENTS

| | | | |
|---|---|---|---|
| 2011/0004588 A1* | 1/2011 | Leitersdorf | G06F 16/951 |
| | | | 707/711 |
| 2012/0278102 A1 | 11/2012 | Johnson | |
| 2013/0011027 A1* | 1/2013 | Zillner | G16Z 99/00 |
| | | | 382/128 |
| 2014/0006013 A1 | 1/2014 | Markatou et al. | |
| 2014/0067414 A1* | 3/2014 | Choi | G16H 50/50 |
| | | | 705/2 |
| 2014/0181128 A1 | 6/2014 | Riskin | |
| 2016/0019351 A1 | 1/2016 | Ober, Jr. | |
| 2017/0219367 A1 | 8/2017 | Liu | |
| 2017/0255536 A1* | 9/2017 | Weissinger | G06F 16/9535 |
| 2018/0032676 A1 | 2/2018 | Mabotuwana | |
| 2018/0068076 A1* | 3/2018 | Farri | G06F 40/45 |

OTHER PUBLICATIONS

Bashyam et al, "Identifying Anatomical Phrases in Clinical Reports by Shallow Semantic Parsing Methods", publisher: IEEE, published: 2007, pp. 210-214 (Year: 2007).*

International Search Report and Written Opinion for International Application No. PCT/EP2019/055954, filed Mar. 11, 2019, 13 pages.

Coden, et al., "Automatically extracting cancer disease characteristics from pathology reports into a Disease Knowledge Representation Model", Journal of Biomedical Informatics 42 (2009), pp. 937-949.

* cited by examiner

IDENTIFYING ANATOMICAL PHRASES

RELATED APPLICATIONS

This application is the U.S. National Phase application under 35 U.S.C. § 371 of International Application No. PCT/EP2019/055954, filed on Mar. 11, 2019, which claims the benefit of Provisional Application Ser. No. 62/642,933, filed Mar. 14, 2018. These applications are hereby incorporated by reference herein, for all purposes.

TECHNICAL FIELD

Embodiments described herein generally relate to systems and methods for identifying anatomical phrases in text and, more particularly but not exclusively, to systems and methods for identifying anatomical phrases in text using a syntactic approach.

BACKGROUND

In order to automatically extract information and data from a medical document (e.g., a radiology report, an oncology clinical note, or the like), it is often necessary for an algorithm to identify all phrases in the document describing a clinical concept. One way of identifying these phrases is by performing lexical matching techniques using a medical ontology such as SNOMED-CT® or RadLex®.

These lexical matching techniques generally have good precision. That is, if a match is identified then it is often a correct match. However, recall is usually low because of several reasons.

For example, ontologies are generally not complete in their lists of synonyms. An example is the concept "CAT scan." Synonyms for this concept include all combinations of the words "computerized, computerised, and computed" with "axial, transaxial, tomography, and tomograph scan." However, SNOMED-CT, for example, only lists 9 of the possible 12 combinations.

Another reason why lexical matching may not work is that ontologies are never complete. This is especially true with regard to more complex concepts. In medical reports, for example, one may encounter fairly complex constructions like "anterior horn of the right lateral ventricle" or "right anterior superior breast." These types of complete phrases are generally not present in an ontology. Additionally, clinicians often do not write the complete phrase if a partial term in combination with the context gives sufficient information.

A need exists, therefore, for systems and methods for identifying anatomical phrases in text that overcome the disadvantages of existing systems and methods.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying anatomical phrases in medical text. The method includes the steps of accessing one or more data sources comprising medical information using an interface; extracting, using a configured processor executing instructions stored on a memory, a set of concepts from a subset of at least one of the data sources; identifying, using the configured processor, a plurality of terms associated with each of the concepts; sorting, using the configured processor, the identified terms into one or more anatomy lists and one or more general lists applying, using the configured processor, at least one grammar rule to at least one term from an anatomy list and at least one term from a general list to generate at least one composite term; and identifying, using the configured processor, the at least one composite term in a medical text accessed using the interface.

In some embodiments, the one or more anatomy lists include an anatomical noun list and an anatomical adjective list; and the one or more general lists include a general noun list and a general adjective list. In some embodiments, the identified terms are sorted based on results of part of speech tagging or dictionary lookup. In some embodiments, the identified terms are sorted based on a weighted majority vote.

In some embodiments, an identified term includes at least two words.

In some embodiments, identifying the plurality of terms associated with each concept includes identifying synonyms of each concept.

According to another aspect, embodiments relate to a system for identifying anatomical phrases in medical text. The system includes an interface for at least accessing one or more data sources comprising medical information and receiving medical text; and at least one configured processor executing instructions stored on a memory to: extract a set of concepts from a subset of at least one of the data sources; identify a plurality of terms associated with each of the concepts; sort the identified terms into one or more anatomy lists and one or more general lists; apply at least one grammar rule to at least one term from an anatomy list and at least one term from a general list to generate at least one composite term; and identify the at least one composite term in a medical text received by the interface.

In some embodiments, the one or more anatomy lists include an anatomical noun list and an anatomical adjective list, and the one or more general lists include a general noun list and a general adjective list. In some embodiments, the identified terms are sorted based on results of part of speech tagging or dictionary lookup. In some embodiments, the identified terms are sorted based on a weighted majority vote.

In some embodiments, an identified term includes at least two words.

In some embodiments, the at least one configured processor identifies the plurality of terms associated with each of the concepts by identifying synonyms of each of the concepts.

According to another aspect, embodiments relate to a computer readable medium containing computer-executable instructions for identifying anatomical phrases in medical text. The medium comprises computer-executable instructions for accessing one or more data sources comprising medical information using an interface; computer-executable instructions for extracting, using a configured processor executing instructions stored on a memory, a set of concepts from a subset of at least one of the data sources; computer-executable instructions for identifying, using the configured processor, a plurality of terms associated with each of the concepts; computer-executable instructions for sorting, using the configured processor, the identified terms into one or more anatomy lists and one or more general lists; computer-executable instructions for applying, using the configured processor, at least one grammar rule to at least one term from an anatomy list and at least one term from a general list to generate at least one composite term; and computer-executable instructions for identifying, using the configured processor, the at least one composite term in a medical text accessed using the interface.

In some embodiments, the one or more anatomy lists include an anatomical noun list and an anatomical adjective list, and the one or more general lists include a general noun list and a general adjective list.

In some embodiments, computer-executable instructions for identifying, using the configured processor, a plurality of terms associated with each of the concepts include computer-executable instructions for identifying synonyms of each concept.

BRIEF DESCRIPTION OF DRAWINGS

Non-limiting and non-exhaustive embodiments of the embodiments herein are described with reference to the following figures, wherein like reference numerals refer to like parts throughout the various views unless otherwise specified.

DETAILED DESCRIPTION

Figure 1:
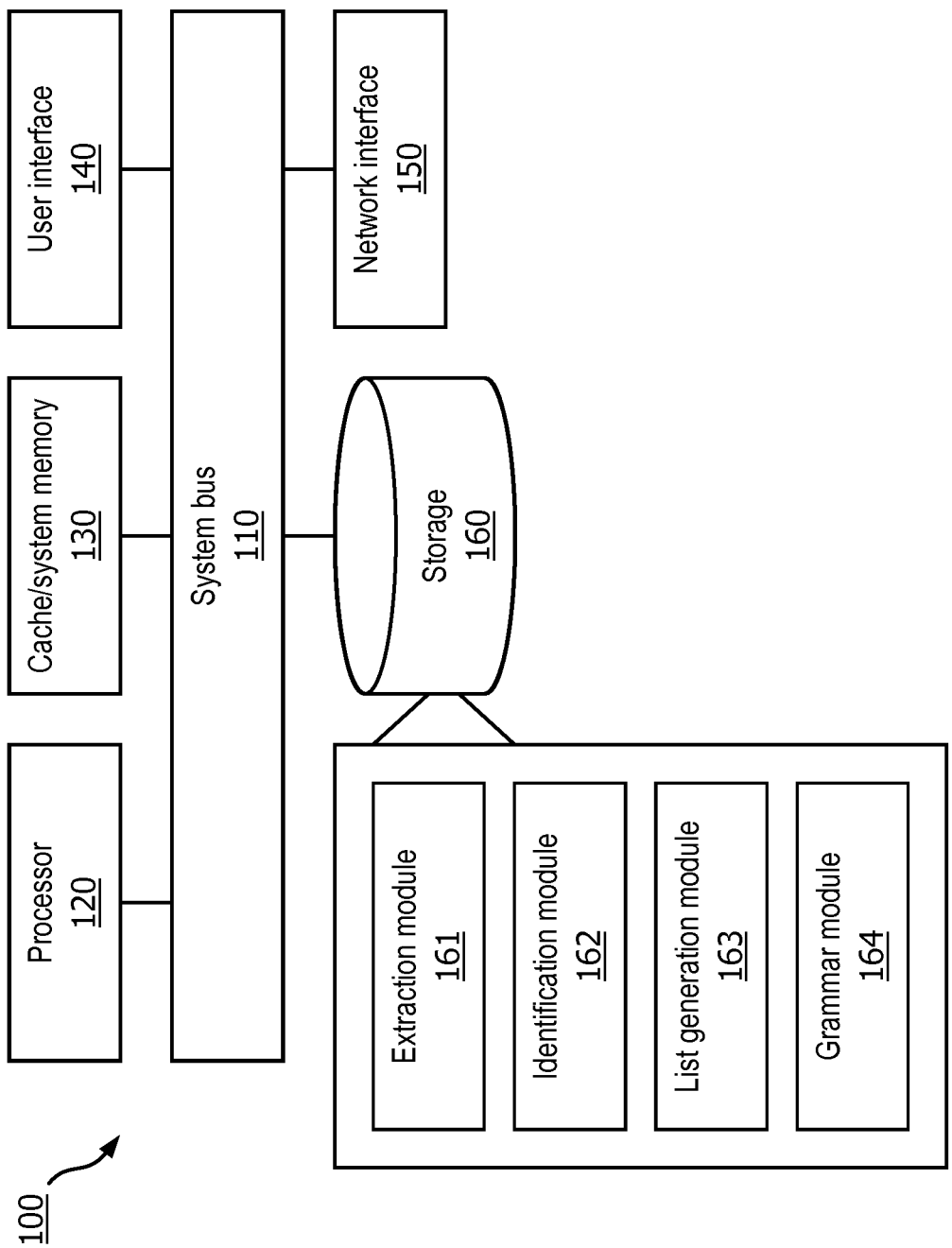
FIG. 1 illustrates a system for identifying anatomical phrases in medical text in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments described herein solve the low recall issues associated with existing techniques by implementing a syntactic approach that generates lists of terms and defines a grammar on these lists. The generated lists may be lists of simple terms, such as those containing one or two words that are from a medical ontology.

The basic rules of the grammar may describe the possible combinations of general and specific adjectives and nouns. For example, the grammar may include rules that recognize that multiple nouns can occur after each other, and that adjectives generally precede nouns.

As another example, general nouns such as "structure" may follow specific nouns (as in "liver structure"). Extended rules of the grammar may describe combinations of concepts for nouns (such as "liver and kidneys") and adjectives (such as "left and right leg"). They may also describe prepositional phrases and combinations of these phrases such as "in the anterior mediastinum anterior to the left pulmonary artery."

A training phase may involve manually annotating all relevant clinical phrases in a set of reports. This ground truth can be used to fine tune both the word lists and the grammar. An evaluation phase may then involve manually annotating all relevant clinical phrases in another set of reports and testing the grammar thereon.

Features of various embodiments described herein may be used in a variety of applications, particularly in applications using NLP procedures. For example, features of various embodiments described herein may automatically convert written pathology reports into structured representations (e.g., oncology dashboards). As another example, features of various embodiments described herein may automatically detect recommendation sentences in a radiology report and the results of the corresponding, resulting studies and treatment procedures. The detection may be based on any one or more of anatomy, modality, and time frame, for example. Similarly, systems and methods described herein may automatically detect the value of a radiology report by correlating the reason for the study to the findings mentioned in the report. As another example, the systems and methods described herein may automatically convert written oncology clinical notes into a structured representation such as a graphical timeline.

FIG. 1 illustrates a system for identifying anatomical phrases in medical text in accordance with one embodiment. The system 100 may include a processor 120, memory 130, a user interface 140, a network interface 150, and storage 160 interconnected via one or more system buses 110. It will be understood that FIG. 1 constitutes, in some respects, an abstraction and that the actual organization of the system 100 and the components thereof may differ from what is illustrated.

The processor 120 may be any hardware device capable of executing instructions stored on memory 130 and/or in storage 160, or otherwise any hardware device capable of processing data. As such, the processor 120 may include a microprocessor, field programmable gate array (FPGA), application-specific integrated circuit (ASIC), or other similar devices.

The memory 130 may include various transient memories such as, for example L1, L2, or L3 cache or system memory. As such, the memory 130 may include static random access memory (SRAM), dynamic RAM (DRAM), flash memory, read only memory (ROM), or other similar memory devices and configurations.

The user interface 140 may include one or more devices for enabling communication with healthcare personnel. For example, the user interface 140 may include a display, a mouse, and a keyboard for receiving user commands. In some embodiments, the user interface 140 may include a command line interface or graphical user interface that may be presented to a remote terminal via the network interface 150. The user interface 140 may execute on a user device such as a PC, laptop, tablet, mobile device, or the like, and may enable a user to input parameters regarding terms of interest, for example.

The network interface 150 may include one or more devices for enabling communication with other remote devices to access one or more data sources comprising medical information. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon which the processor 120 may operate.

For example, the storage 160 may include an extraction module 161, an identification module 162, a list generation module 163, and a grammar module 164. The extraction module 161 may be configured to execute instructions stored on the memory 130 to extract a set of concepts from a subset of an ontology or other data sources comprising medical information.

In the context of the present application, the term "ontology" may refer to a collection of medical documents in which anatomical locations have been annotated. As another example, disease ontologies may be well structured ontologies for describing human diseases. While several medical-related ontologies are used for insurance and billing purposes, they may also be used to accomplish the various features of the embodiments described herein There are many ontologies that may be used in conjunction with the systems and methods described herein. These may include, but are not limited to, the Foundational Model of Anatomy (FMA), Radlex, SNOMED-CT, or some combination thereof.

The extraction module 161 may extract a set of concepts representing body structures from an ontology such as SNOMED-CT. These concepts can be found as the tree of nodes starting with the node "Body structure." The category "Qualifiers Value" may also contain needed words such as certain adjectives (e.g., "colonic").

Figure 2:
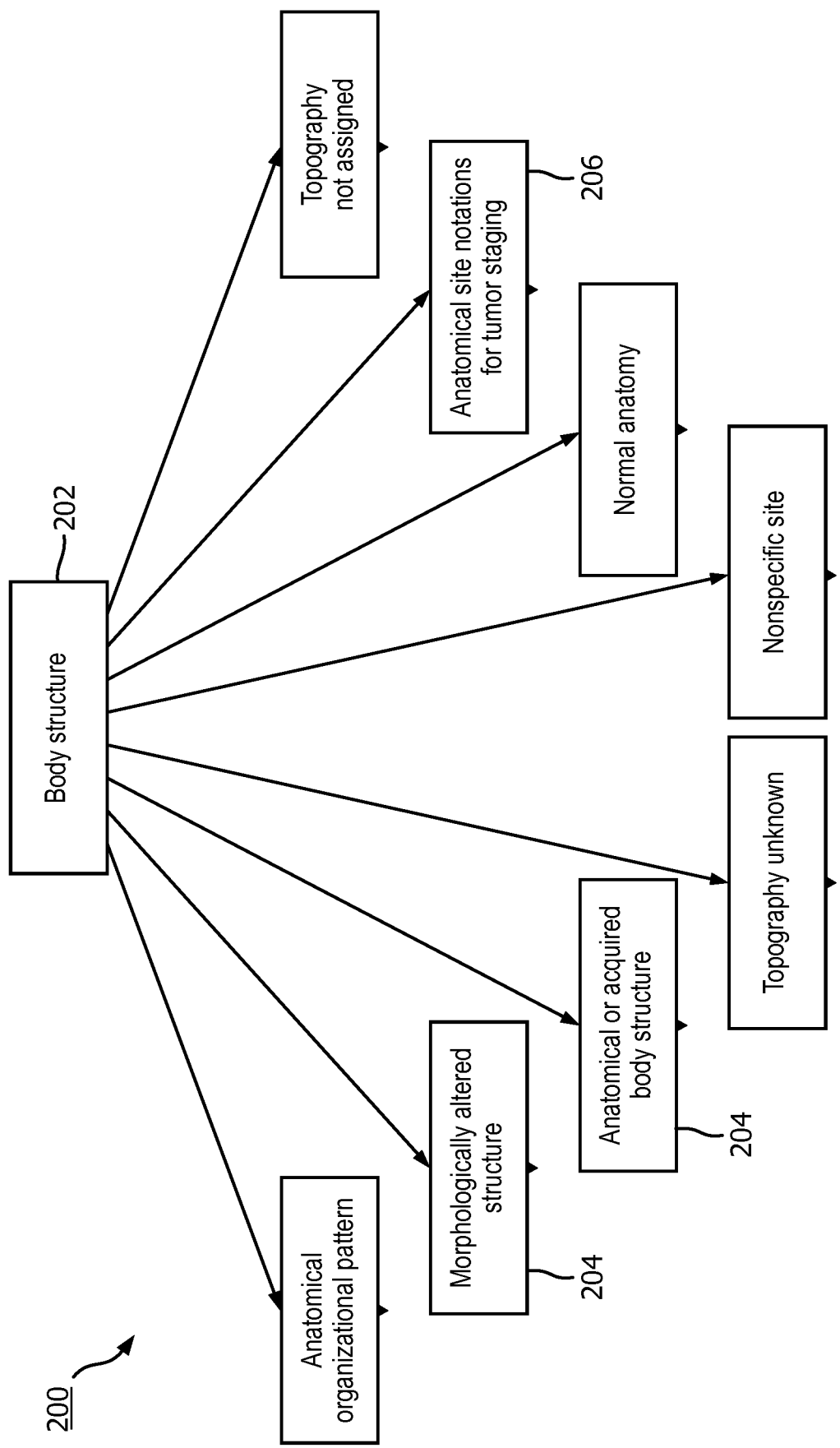
FIG. 2 depicts a visual illustration of a portion of the SNOMED-CT ontology in accordance with one embodiment.

For example, FIG. 2 depicts a visual illustration of a portion of the SNOMED-CT ontology 200. Specifically, FIG. 2 illustrates the "Body structure" node 202 along with a plurality of sub-nodes 204. Each sub node 204 may be further broken down into individual sub-trees. Not all sub-nodes, sub-sub nodes, etc., need to be considered (e.g., "Anatomical site for tumor staging' 206 may be excluded).

The identification module 162 may then identify a plurality of words associated with the extracted concepts. For example, the identification module 162 may identify synonyms of all concepts found.

The list generation module 163 may then sort the identified terms into one or more anatomy lists and one or more general lists. For example, Table 1 below presents four term lists. These lists include a list of anatomy-specific nouns, a list of general nouns (i.e., nouns that can be used in the description of an anatomy but do not denote anything anatomical by themselves), a list of anatomy-specific adjectives, and a list of general adjectives (i.e., adjectives that can be used in a description of an anatomy but do not denote anything anatomical by themselves).

TABLE 1

Exemplary Term Lists

| Anatomy-Specific Nouns | General Nouns | Anatomy-specific Adjectives | General Adjectives |
|---|---|---|---|
| Liver Neck | Tip Region Area | Hepatic Pulmonary | Anterior Medial Lower |

To generate the lists such as those of Table 1 above, the list generation module 163 can leverage the set of synonyms of anatomical concepts identified by the identification module 162. The list generation module 163 may additionally consider hyponyms and/or hypernyms of anatomical concepts.

In some embodiments, the list generation module 163 may start with four empty lists. The list generation module 163 may then take, e.g., synonyms that consist of one word and add those words to the list of anatomy-specific nouns or adjectives. Whether the synonyms are added to the adjective list or the noun list may depend on whether the concept is a basic body structure or, e.g., a specific site descriptor.

Subsequently, the list generation module 163 or a human operator may take synonyms that consist of two words and check whether either of the words is already in the anatomy-specific noun or adjective list. If one of the words is in the list and the other is not, two assumptions can be made about the unidentified words. The first assumption is whether the unidentified word is a noun or adjective, and the second assumption is whether the unidentified word is a specific or general word.

The position of the unidentified word in a two-word synonym helps determine whether it is a noun or adjective. The occurrence of the word in a general word list (such as one derived from an NLP resource such as WordNet) may determine whether it is a specific or general word.

The list generation module 163 may then repeat this procedure for three-word synonyms, four-word synonyms, and so on. Although Table 1 shows four lists, the list generation module 163 may merge the noun and adjective lists and use only two term lists (i.e., anatomy-specific and general).

The separation into nouns and adjectives may be based on the results of Part of Speech tagging or dictionary lookup instead of, for example, based on the position of the new word in the synonym. Additionally or alternatively, multiple separation methods may be used and the final categorization may be based on a majority vote. In some embodiments, this may be a weighted majority vote.

The grammar may be defined such that it describes possible combinations of the terms in the list along with auxiliary words such as "in" and "the." Systems and methods of various embodiments described herein may then search for phrases in a particular text that conform to the grammar.

Systems and methods described herein may deliberately keep the grammar relatively unrestricted. That is, the systems and methods allow phrases that syntactically could describe clinical concepts, but would be meaningless based purely on semantics.

An example of this is the phrase "left heart." Systems and methods described herein may detect this as a clinical concept because it knows that "heart" is a clinical concept and "left" is a modifier (even though this particular combination of words is clinically meaningless). This is not a problem when parsing clinical texts, since these meaningless combinations would likely not occur in practice.

In addition to or in lieu of the list generation module 163 automatically distributing terms between, e.g., general and anatomy-specific lists, this distribution may be done manually by having an operator classify each word, or by using a training set and moving words from the anatomy-specific list to the general list or vice versa (or remove them altogether). A combination of automatic distribution and manual correction is also possible in accordance with various embodiments.

Additionally or alternatively, these manual annotations can fine tune lists by noting which annotations are correctly identified, which annotations are missed, and/or which phrases are incorrectly identified as anatomical locations. This could be done manually and/or by some automatic algorithm.

For example, an algorithm may calculate one or more analysis scores on the annotated documents. These score(s) may include a recall score, which is the number of relevant terms retrieved by a search divided by the total number of existing relevant terms. The score(s) may include a precision score, which is the number of relevant terms divided by the number of total terms received by a search. The score(s) may also include an F-Score, which is the product of the precision and recall scores divided by the sum of the precision and recall scores, multiplied by 2.

The algorithm may then add/remove/move words in the list(s) to see how the addition/removal/movement influences the score(s). The algorithm may then search for an optimum distribution of the words in the lists based on the calculated score(s).

It is noted that some terms for clinical concepts do not consist of an anatomy-specific word. One example is "Adam's apple." Neither "Adam" nor "apple" are words that are anatomy-specific. This example can be solved by recognizing that "Adam's apple" is a two-word term.

Although the terms in Table 1 are referred to as anatomical nouns, these nouns need not all describe an anatomy. For example, the term "adamkiewicz" refers to an artery that is named after pathologist Albert Adamkiewicz. This term generally only occurs in medical reports in conjunction with the phrase "artery of Adamkiewicz." Accordingly, the term "adamkiewicz" itself does not describe an anatomy. However, it may be beneficial to include in the list if healthcare personnel use only the term "adamkiewicz" to denote "artery of Adamkiewicz." This may be common as many medical reports contain incomplete terms if it is clear what is meant based on context.

It is also possible that some adjectives occur in anatomical phrases as well as other, non-anatomical phrases. For example, in the phrase "a small liver tumor," the word "small" refers to the "tumor." However, in the phrase "the small bowel," the word "small" together with "bowel" describes a particular anatomy. To deal with this, the word "small" is not added to a list, but instead the term "small bowel" is recognized as a two-word term.

Some phrases, such as "aorticopulmonary window," contain specific anatomic terms (i.e., "aorticopulmonary") but are not considered to be an anatomical phrase. Systems and methods of various embodiments described herein may recognize these types of terms as two-word terms that are ignored.

The grammar may contain other words such as articles, prepositions, and conjunctions that are not in a generated list. For example, a grammar rule may be something along the lines of "x AnW y AnW" where:
- "x" is an article, a word from a subset of all articles, a word from the union of articles and pronouns, etc.
- "AnW" may be an anatomical word or an anatomical noun, and
- "y" may be a conjunction or a word from a subset of conjunctions.

This type of grammar rule may therefore capture phrases like "the liver and spleen."

It is also possible that the word lists can be saved and then loaded whenever a text needs to be parsed. That way, the systems and methods described herein aren't required to repeatedly process the one or more data sources.

Figure 3:
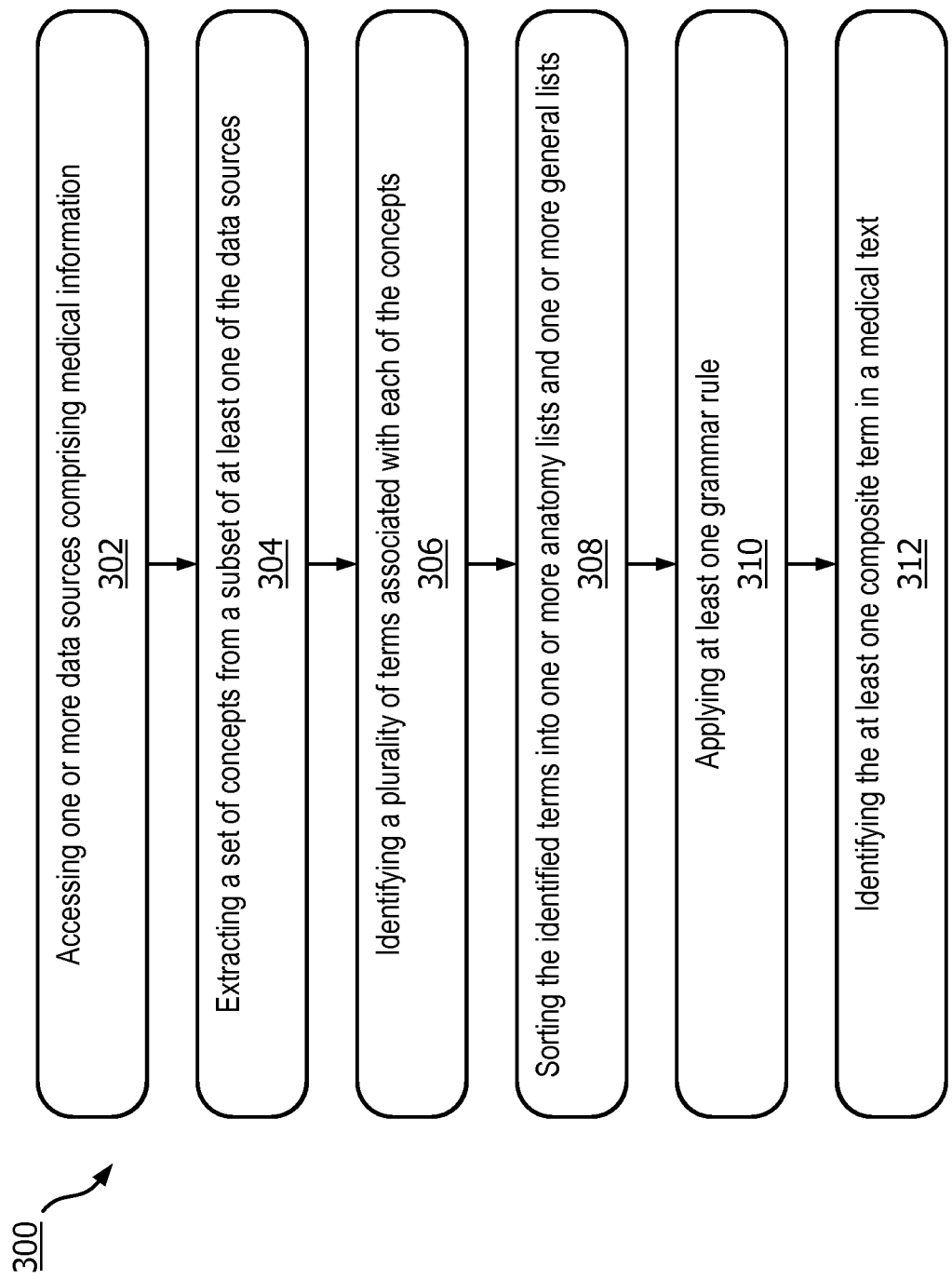
FIG. 3 depicts a flowchart of a method for identifying anatomical phrases in medical text in accordance with one embodiment.

FIG. 3 depicts a flowchart of a method 300 for identifying anatomical phrases in medical text in accordance with one embodiment. Step 302 involves accessing one or more data sources comprising medical information using an interface. As mentioned previously, these data sources may include ontologies such as FMA, Radlex, SNOMED-CT, or some combinations thereof.

Step 304 involves extracting, using a configured processor executing instructions stored on a memory, a set of concepts from a subset of at least one of the data sources. For example, step 304 may involve extracting a set of concepts that represent body structures from the SNOMED-CT ontology as illustrated in FIG. 2. Step 304 may be performed by the extraction module 161 of FIG. 1.

Step 306 involves identifying, using the configured processor, a plurality of terms associated with each of the concepts. This step may be performed by the identification module 162 of FIG. 1. Step 306 may involve, for example, identifying synonyms of the extracted concepts.

Step 308 involves sorting, using the configured processor, the identified terms into one or more anatomy lists and one or more general lists. These lists may be similar to the lists of Table 1, above. As mentioned earlier, only two lists may be used, or more than two lists may be used. Step 308 may be performed by the list generation module 163 of FIG. 1.

Step 310 involves applying, using the configured processor, at least one grammar rule to at least one term from an anatomy list and at least one term from a general list to generate at least one composite term. The applied grammar rule may be similar to any one or more of the grammar rules described above.

Step 312 involves identifying, using the configured processor, the at least one composite term in a medical text accessed using the interface. This step may be performed by the identification module 162 of FIG. 1. Accordingly, more composite terms can be identified in medical text than would be using conventional, lexical-based techniques.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for identifying anatomical phrases in medical text, the method comprising:
   accessing one or more data sources comprising medical information using a network interface, the medical information comprising medical text;
   extracting, using a configured processor executing instructions stored on a memory, a set of concepts from a subset of at least one of the data sources;
   identifying, using the configured processor, a plurality of terms associated with each of the concepts, wherein identifying the plurality of terms associated with each of the concepts includes identifying synonyms of each concept;

implementing a syntactic method by:
sorting, using the configured processor, the identified terms into one or more anatomy lists and one or more general lists, wherein the sorting includes initially sorting single term synonyms into anatomy-specific nouns or adjectives based on whether one of the concepts is a body structure or an anatomy-specific descriptor, then iteratively adding additional terms for further sorting into an anatomy-specific noun or adjective and a general noun or adjective, the general noun or adjective for use in describing an anatomy without denoting anything anatomical standing alone; and
defining a grammar on the one or more anatomy lists and the one or more general lists by applying, using the configured processor, at least one grammar rule to at least one term from the one or more anatomy lists and at least one term from the one or more general lists to generate at least one composite term; and
identifying, using the configured processor, the at least one composite term associated with the medical text accessed using the network interface.

2. The method of claim 1, wherein the one or more anatomy lists include an anatomical noun list and an anatomical adjective list; and the one or more general lists include a general noun list and a general adjective list.

3. The method of claim 2, wherein the identified terms are sorted based on results of part of speech tagging or dictionary lookup.

4. The method of claim 2, wherein the identified terms are sorted based on a weighted majority vote.

5. The method of claim 1, wherein an identified term includes at least two words.

6. A system for identifying anatomical phrases in medical text, the system comprising:
a network interface to access one or more data sources comprising medical information and receiving medical text, the medical information comprising medical text; and
at least one configured processor executing instructions stored on a memory to:
extract a set of concepts from a subset of at least one of the data sources;
identify a plurality of terms associated with each of the concepts, wherein identifying the plurality of terms associated with each of the concepts includes identifying synonyms of each concept;
implement a syntactic method by:
sorting the identified terms into one or more anatomy lists and one or more general lists, wherein the sorting includes initially sorting single term synonyms into anatomy-specific nouns or adjectives based on whether one of the concepts is a body structure or an anatomy-specific descriptor, then iteratively adding additional terms for further sorting into an anatomy-specific noun or adjective and a general noun or adjective, the general noun or adjective for use in describing an anatomy without denoting anything anatomical standing alone; and
defining a grammar on the one or more anatomy lists and the one or more general lists by applying at least one grammar rule to at least one term from the one or more anatomy lists and at least one term from the one or more general lists to generate at least one composite term; and
identify the at least one composite term associated with the medical text received by the network interface.

7. The system of claim 6, wherein the one or more anatomy lists include an anatomical noun list and an anatomical adjective list, and the one or more general lists include a general noun list and a general adjective list.

8. The system of claim 7, wherein the identified terms are sorted based on results of part of speech tagging or dictionary lookup.

9. The system of claim 7, wherein the identified terms are sorted based on a weighted majority vote.

10. The system of claim 6, wherein an identified term includes at least two words.

11. A non-transitory computer readable medium containing computer-executable instructions for configuring a processor to identify anatomical phrases in medical text, the medium comprising computer-executable instructions executed by the configured processor for:
accessing one or more data sources comprising medical information using a network interface, the medical information comprising medical text;
extracting a set of concepts from a subset of at least one of the data sources;
identifying a plurality of terms associated with each of the concepts, wherein identifying the plurality of terms associated with each of the concepts includes identifying synonyms of each concept;
implementing a syntactic method by:
sorting the identified terms into one or more anatomy lists and one or more general lists, wherein the sorting includes initially sorting single term synonyms into anatomy-specific nouns or adjectives based on whether one of the concepts is a body structure or an anatomy-specific descriptor, then iteratively adding additional terms for further sorting into an anatomy-specific noun or adjective and a specific or general noun or adjective, the general noun or adjective for use in describing an anatomy without denoting anything anatomical standing alone;
defining a grammar on the one or more anatomy lists and the one or more general lists by applying at least one grammar rule to at least one term from the one or more anatomy lists and at least one term from the one or more general lists to generate at least one composite term; and
identifying the at least one composite term associated with the medical text accessed using the network interface.

12. The medium of claim 11, wherein the one or more anatomy lists include an anatomical noun list and an anatomical adjective list, and the one or more general lists include a general noun list and a general adjective list.

* * * * *